June 28, 1960 W. A. ZALE 2,942,891
WORK HOLDER CHUCK DEVICE
Filed March 5, 1959 2 Sheets-Sheet 1

INVENTOR
WALTER A. ZALE
BY G. L. De Motto
ATTORNEY

June 28, 1960   W. A. ZALE   2,942,891
WORK HOLDER CHUCK DEVICE
Filed March 5, 1959   2 Sheets-Sheet 2

INVENTOR
WALTER A. ZALE
BY G. L. DeMott
ATTORNEY

United States Patent Office 2,942,891
Patented June 28, 1960

2,942,891

WORK HOLDER CHUCK DEVICE

Walter A. Zale, Flint, Mich., assignor to General Motors Corporation, Detroit, Mich., a corporation of Delaware Filed Mar. 5, 1959, Ser. No. 797,473

10 Claims. (Cl. 279—1)

This invention relates to work holder chuck devices and more particularly to precision chuck holding devices for positioning an object that is to have an inside diameter machined concentrically with respect to its outside diameter.

Commercial outside diameter work holding devices presently available, such as three-jaw chucks and precision collets, provide only for limited degrees of concentricity between respective inside and outside diameters of particular work pieces. These devices can only guarantee maximum eccentricity to approximately .001 inch. Such a limitation is believed to result from the employment of moving mechanical members in the currently used work holders. Many present manufacturing processes require errors of concentricity to be less than .001 inch and will continue to require more precise tolerances as our machine age becomes more complex. Therefore, the value of the present invention is readily apparent.

Accordingly, among the objects of this invention are the provisions of a work holder chuck device for accurately positioning and holding an object by its outside diameter to permit concentric machining of an inside diameter, and provisions for reducing errors in concentricity to a minimum by eliminating moving mechanical parts in a work holder chuck assembly.

The aforementioned objects are accomplished by expanding and contracting a cylindrical work holder about the work piece to allow insertion, machining and removal operations. The work holder member incorporates a hollow cylinder of temperature responsive material such that the inner diameter of the cylinder is uniformly expanded to receive the work piece therein and is uniformly contracted by a cooling fluid or other means to rigidly hold the work piece during a machining operation.

Figure 1:
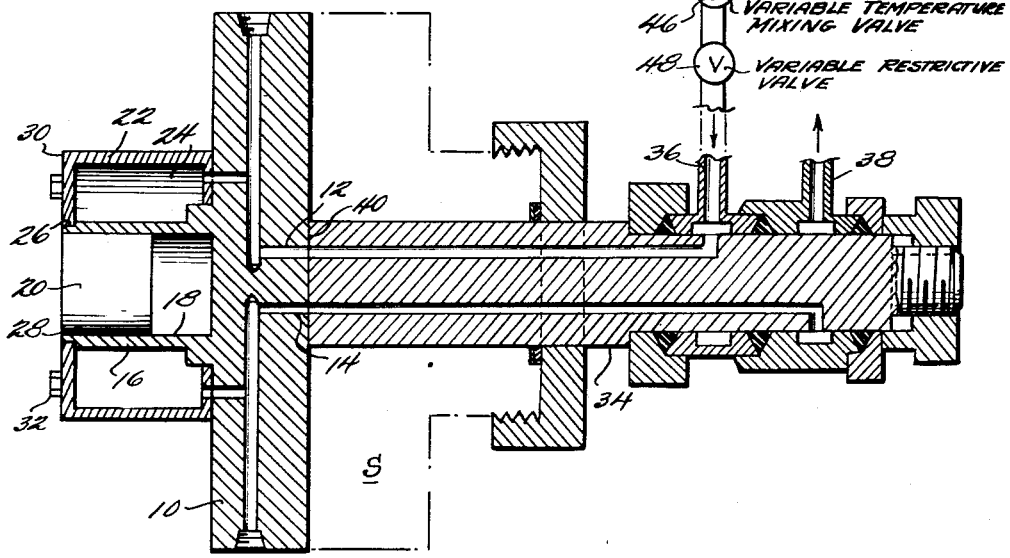
Fig. 1 is a cross-sectional view of one embodiment of the present invention showing the individual parts assembled to form a work holder chuck device.
Figure 2:
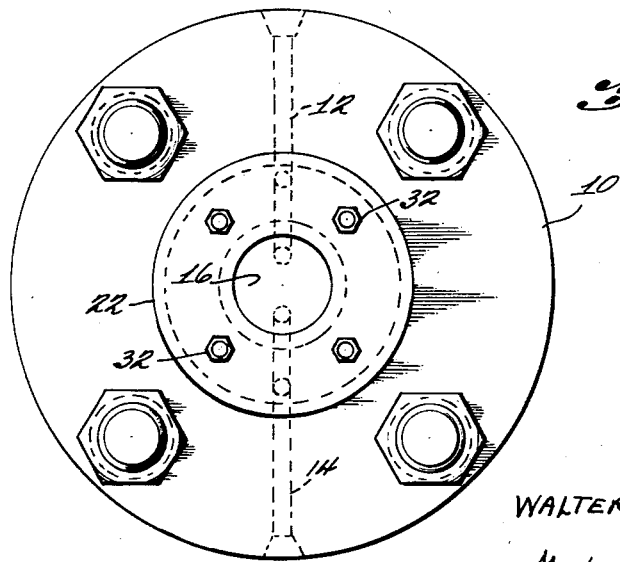
Fig. 2 is an end view of Fig. 1 more clearly illustrating the shape and disposition of parts comprising the subject invention.

Referring now to Fig. 1 of the drawings, a work holder chuck device embodying the subject invention incorporates a base member 10 containing a fluid inlet passage 12 and a fluid outlet passage 14 to direct fluid to and away from an integral temperature responsive work holder cylinder 16. The temperature responsive work holder cylinder 16 is provided with a work receiving recess 18 having an inside diameter of a predetermined size. A work piece generally indicated at 20 is shown as positioned in the recess 18. The work holder cylinder 16 is enclosed by a cylinder closure member 22 and forms therewith an annular fluid chamber 24. The temperature responsive work holder cylinder as shown in Fig. 1 is further provided with a machined shoulder 26 that is engaged by a mating shoulder 28 machined in a face 30 integral with the cylinder closure member 22. The cylinder closure member 22 is secured to the base member 10 by bolts 32 received in aligned holes in the respective members. Conventional fastening means other than the bolts 32 may be employed.

The base member 10 is rigidly secured to a machine tool spindle or support generally designated at S. The machine tool spindle or support S contains, for purposes of illustration, a conventional stationary to rotary fluid coupling 34 to transfer fluid to the work holder chuck device. The fluid coupling 34 includes an inlet passage 36 and an outlet passage 38 each of which extends through the spindle S and by way of a fluid-tight connection 40 are coupled to the inlet passage 12 and outlet passage 14 in the work holder base member 10.

Fluid of a regulated temperature and flow is supplied to the stationary to rotary coupling 34 from a heated supply tank 42 and a cold supply tank 44. The fluid temperature is selectively controlled by a conventional variable temperature mixing valve 46 while the flow is regulated by a conventional variable restrictor valve 48. Fluid enters the annular fluid chamber 24 by way of passage 12, flows around the work holder cylinder 16 and through the outlet passage 14 whereby the fluid is discharged to a supply source not shown.

Figure 3:
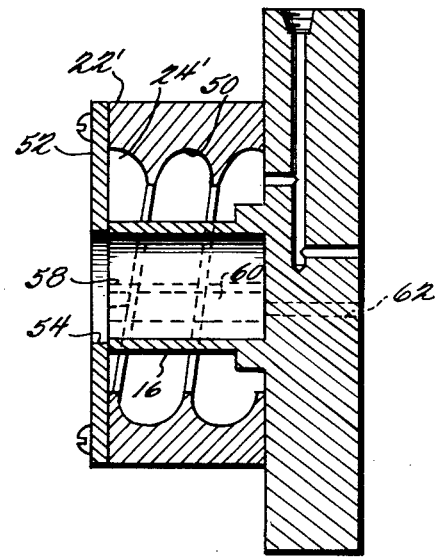
Fig. 3 is a cross-sectional view of a preferred embodiment of the temperature responsive cylinder closure member incorporated in the present invention.
Figure 4:
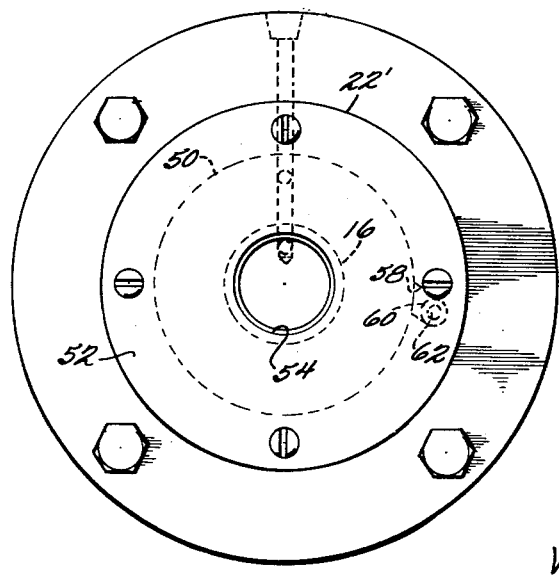
Fig. 4 is an end view of Fig. 3.

Figures 3 and 4 illustrate a preferred embodiment of the temperature responsive cylinder closure member shown in combination with a removable cap member. The cylinder closure member 22' in this configuration comprises a spiral baffle milled recess 50 coacting with the cylinder 16 to provide a helical fluid passage 24' about the cylinder. The spiral baffle recess 50 terminates in open ends of cylinder closure member 22', making it necessary to employ a cap member 52 to seal the passage at the work receiving end of cylinder 16. The cap member 52 has a circular aperture 54 therein that has a diameter slightly greater than the predetermined diameter of the work receiving recess 18 to allow insertion of a work piece during expansion and retraction of cylinder 16 and at the same time form a liquid seal between the cap and the cylinder 16. Screws or bolts 56 can be used to fasten the cap and the closure member 22' to the base member 10. This configuration assures a more desirable fluid circulation as the spiral recess 50 directs flow about the temperature responsive work holder cylinder 16 while the fluid is maintained in continuous contact therewith.

Fluid enters the helical passage 24' in the same manner it does in the previously discussed embodiment; however, the discharge passages are modified. The cylinder closure member 22' contains a milled channel 58 and a hole 60 that is aligned with a passage 62 in the base member 10. The fluid flows through the helical recess around the work holder cylinder 16 and through the milled channel 58 at the downstream end of the closure member 22'. It then passes through the discharge hole 60 to the base passage 62 whereby it returns to a supply source not shown.

In operation, the variable temperature mixing valve 46 and the flow regulating valve 48 of a conventional type are provided to cycle flow of a temperature regulated fluid to the fluid chamber 24 as desired. When the machine operator wishes to place a work piece 20 in the temperature responsive work holder cylinder 16, fluid at a temperature approximately 90° Fahrenheit (F.) above room temperature is circulated through the system to expand the work holder cylinder. A restricting valve can be built in the fluid passage base member 10 or placed in the external fluid lines to regulate the rate of flow through the system to maintain the necessary temperature differential. Upon expansion of the work holder cylinder the work piece 20 is placed within the holding cylinder 16, and the aforementioned control valve is actuated to transmit room temperature fluid through the system to contract the cylinder 16. This contraction of the work holder cylinder causes the cylinder to rigidly grip the work piece 20. The machining operation is then performed and the heated liquid recycled through the system expanding the cylinder 16 to remove the work piece 20. Room temperature fluid can be circulated through the chuck to prevent releasing of the work object while the machining operation is being performed. In installations where induction heating is used to expand the chuck, the operator must take measures to determine whether an excessive amount of heat, due to the machining operation, is being transferred to the work holder cylinder.

The components of this work holder chuck are machined to a tolerance of .0001 inch. It has been determined that total movement required for opening the chuck is approximately .0004 inch on the diameter and that an estimated temperature differential of 90° F. will produce this movement. Chuck closing or contracting temperature could be established at approximately room temperature, and therefore the opening temperature would be approximately 90° F. above room temperature. The use of this temperature differential would appear to be most advantageous as the room temperature fluid is cool enough to contract the work holder cylinder without additional cooling problems. In the event it is found that an excessive amount of heat is dissipated to the temperature responsive cylinder 16 to expand the work holding cylinder, it is necessary to cool the cylinder while the machining operation is in progress. This can be accomplished by reducing the fluid temperature below that of room temperature or by increasing the rate of flow in the system or both.

The invention as described above is directed to the use of a fluid chamber to convey heat to and away from the work holder cylinder 16 to produce the desired expansion and contraction. However, it is obvious that an electrical induction heating unit could be incorporated to accomplish like results.

In accordance with the invention, a work holder chuck device is provided to allow precise machining of annular objects. The described work holder chuck does not incorporate moving mechanical parts and therefore assures the reduction in errors of concentricity to the lowest mechanically possible. This reduction in errors is attainable since there are no twisting motions or distortions normally caused by moving parts.

The above described illustrations are obviously subject to modifications without exceeding the scope of the appended claims.

What I claim is:

1. A work holder chuck device comprising a base member adapted to be secured to a support, an expansible and contractible temperature responsive member connected to said base member, said temperature responsive member having means to receive a work piece, and means for regulating the temperature of said temperature responsive member whereby said temperature responsive member contracts to hold a work piece therein and expands to permit release of said work piece.

2. In a work holder chuck device a base member adapted to be secured to the spindle of a machine tool, an expansible and contractible temperature responsive member, said temperature responsive member being integral with said base member and having means to receive a work piece, and means for regulating the temperature of said temperature responsive member whereby said temperature responsive member contracts to rigidly hold a work piece therein during a machining operation and expands to permit release of said work piece.

3. A work holder chuck device comprising a base member adapted to be secured to a support, a temperature responsive member secured to said base member and having an aperture therein to receive a work piece, a closure member having a spiral baffle recess therein terminating in open ends, said closure member being secured to said base member about said temperature responsive member to enclose the same, said spiral baffle recess being concentric with said temperature responsive member and forming a spiral fluid chamber thereabout, a cap member connected to the closure member to seal one of said open ends of said spiral chamber remote from said base member, means providing a fluid outlet passage from said one of said ends, said cap member having an aperture in alignment with said aperture in said temperature responsive member to permit the placing of said work piece within said aperture of said temperature responsive member, and means connected to said device for regulating and transmitting the flow of a variable temperature fluid to said spiral chamber through said other open end whereby said temperature responsive member contracts when subjected to prevailing room temperature fluid to rigidly hold said work piece therein during a machining operation and expands when subjected to a relatively high temperature fluid to permit removal of said work piece.

4. A work holder chuck device as defined by claim 3 wherein said means providing a fluid outlet passage includes a first passage extending in a substantially axial direction through said closure member and a milled channel in said cap member extending between said spiral fluid chamber and said first passage.

5. A work holder chuck device comprising a base member adapted to be fastened to a support, a temperature responsive work receiving cylinder connected to said base member, a closure member enclosing said temperature responsive work receiving cylinder, means in said closure member defining fluid passages between said closure member and said work receiving member, and means regulating the temperature and flow of a fluid within said passages to expand and contract said work-receiving cylinder about a workpiece.

6. A work holder chuck device comprising a base member, a temperature responsive work receiving cylinder integral with the base member and having an inside diameter of a predetermined size, a closure member secured to said base member and enclosing said temperature responsive work receiving cylinder, means in said closure member defining spiral fluid passages between said closure member and said work receiving member, and regulating means for varying the temperature and flow of a fluid within said passages thereby expanding and contracting said work-receiving cylinder to alter the size of said inside diameter.

7. In a work holder chuck device, a base member adapted to be fastened to a support, a temperature responsive work receiving cylinder connected to said base member, a closure member enclosing said temperature responsive work receiving cylinder, said closure member being secured to said base member, a closure cap member fastened to the end of said closure member remote from said base member, means in said closure member defining fluid passages between said closure member, said work receiving cylinder and said cap member, and regulating means subjecting said work-receiving cylinder to controlled fluid temperatures and flow thereby expanding and contracting said cylinder about a workpiece.

8. In a work holder chuck device a source of high temperature fluid, a source of prevailing room temperature fluid, a temperature regulating valve, a flow regulating valve, a base member adapted to be fastened to a support, a temperature responsive work-receiving cylinder connected to said base member, a closure member enclosing said temperature responsive work-receiving cylinder, means in said closure defining fluid passages between said closure member and said work-receiving member, and means connecting said fluid passages, said fluid sources, and said valves, thereby subjecting said work-receiving member to regulated fluid flows to expand and contract said member about a workpiece.

9. In a work holder chuck device a source of high temperature fluid, a source of amibent air temperature fluid, a temperature regulating valve, a flow regulating valve, a base member adapted to be fastened to a support, a temperature responsive work-receiving cylinder connected to said base member, a closure member enclosing said temperature responsive work-receiving cylinder, means in said closure defining fluid passages between said closure member and said work-receiving member, and means connecting said fluid passages, said fluid sources, and said valves, thereby subjecting said work-receiving member to regulated fluid flows to expand and contract said member about a workpiece.

10. In a work holder chuck device a source of heated fluid, a source of ambient temperature fluid, temperature regulating means, flow regulating means, a base member adapted to be fastened to a support, a temperature responsive work-receiving member connected to said base member, a closure member enclosing said work-receiving member, means in said closure defining fluid passages between said closure member and said work-receiving member, and means connecting said fluid passages with said fluid sources and said regulating means to subject said work-receiving member to fluid of predetermined temperatures and flows to expand and contract said work-receiving member about a workpiece.

References Cited in the file of this patent

UNITED STATES PATENTS

| | | |
|---|---|---|
| 995,537 | Hertner et al. | June 20, 1911 |
| 2,787,956 | Kirby et al. | Apr. 9, 1957 |